(12) United States Patent
Kakiage et al.

(10) Patent No.: US 12,519,109 B2
(45) Date of Patent: Jan. 6, 2026

(54) ELECTRODE FOR NONAQUEOUS ELECTROLYTE SECONDARY BATTERIES AND NONAQUEOUS ELECTROLYTE SECONDARY BATTERY USING SAID ELECTRODE

(71) Applicant: ADEKA CORPORATION, Tokyo (JP)

(72) Inventors: Kenji Kakiage, Tokyo (JP); Yohei Aoyama, Tokyo (JP)

(73) Assignee: ADEKA CORPORATION, Tokyo (JP)

( * ) Notice: Subject to any disclaimer, the term of this patent is extended or adjusted under 35 U.S.C. 154(b) by 701 days.

(21) Appl. No.: 17/763,836

(22) PCT Filed: Sep. 14, 2020

(86) PCT No.: PCT/JP2020/034675
§ 371 (c)(1),
(2) Date: Mar. 25, 2022

(87) PCT Pub. No.: WO2021/060045
PCT Pub. Date: Apr. 1, 2021

(65) Prior Publication Data
US 2022/0328834 A1    Oct. 13, 2022

(30) Foreign Application Priority Data

Sep. 27, 2019 (JP) .................................. 2019-176318

(51) Int. Cl.
| H01M 4/60 | (2006.01) |
| H01M 4/02 | (2006.01) |
| H01M 4/04 | (2006.01) |
| H01M 4/62 | (2006.01) |

(52) U.S. Cl.
CPC ......... *H01M 4/604* (2013.01); *H01M 4/0404* (2013.01); *H01M 2004/021* (2013.01); *H01M 4/623* (2013.01); *H01M 4/625* (2013.01)

(58) Field of Classification Search
CPC .......................... H01M 4/0404; H01M 4/604
See application file for complete search history.

(56) References Cited

U.S. PATENT DOCUMENTS

| 5,516,598 A | * | 5/1996 | Visco | ...................... H01M 4/60 429/105 |
| 2011/0200875 A1 | * | 8/2011 | Miyuki | ..................... C08F 8/34 429/213 |
| 2014/0134485 A1 | * | 5/2014 | Miyuki | ................. H01M 4/604 429/211 |
| 2020/0335789 A1 | * | 10/2020 | Kakiage | ............ H01M 10/0569 |

FOREIGN PATENT DOCUMENTS

| CN | 1619861 | 5/2005 |
| JP | 10-505705 | 6/1998 |
| JP | 2003-151550 | 5/2003 |
| JP | 2004-47462 | 2/2004 |
| JP | 2008-184647 | 8/2008 |
| JP | 2011-28948 | 2/2011 |
| JP | 2011-170991 | 9/2011 |
| JP | 2012-99342 | 5/2012 |
| JP | 2012-150933 | 8/2012 |
| JP | 2012-150934 | 8/2012 |
| JP | 2014-96326 | 5/2014 |
| JP | 2014-96327 | 5/2014 |
| JP | 2015-92449 | 5/2015 |
| WO | 2010/044437 | 4/2010 |
| WO | 2012/114651 | 8/2012 |
| WO | 2016/158675 | 10/2016 |
| WO | 2016/159212 | 10/2016 |
| WO | 2019/088088 | 5/2019 |
| WO | 2019/167875 | 9/2019 |
| WO | WO-2019181703 A1 * | 9/2019 .......... H01M 10/052 |

OTHER PUBLICATIONS

International Search Report issued Oct. 27, 2020 in International (PCT) Application No. PCT/JP2020/034675.

* cited by examiner

*Primary Examiner* — Karie O'Neill Apicella
(74) *Attorney, Agent, or Firm* — Wenderoth, Lind & Ponack, L.L.P.

(57) ABSTRACT

The present invention provides an electrode for a non-aqueous electrolyte secondary battery, including: a current collector; and an electrode active material mixture layer containing an organosulfur electrode active material, a conductive assistant, and a binder, wherein the electrode active material mixture layer contains 0.01 mass % to 0.4 mass % of the binder with respect to a total mass of the electrode active material mixture layer, and wherein the electrode active material mixture layer is formed on the current collector.

9 Claims, No Drawings

ELECTRODE FOR NONAQUEOUS ELECTROLYTE SECONDARY BATTERIES AND NONAQUEOUS ELECTROLYTE SECONDARY BATTERY USING SAID ELECTRODE

TECHNICAL FIELD

The present invention relates to an electrode for a non-aqueous electrolyte secondary battery in which an electrode active material mixture layer containing an electrode active material and a binder is formed on a current collector, and to a non-aqueous electrolyte secondary battery using the electrode.

BACKGROUND ART

A lithium ion secondary battery has been widely used as a power source for a portable electronic device, such as a portable personal computer, a handy video camera, or an information terminal, because the lithium ion secondary battery is compact and lightweight, has a high energy density, has a high capacity, and can be charged and discharged repeatedly. In addition, an electric vehicle using the lithium ion secondary battery, and a hybrid car utilizing electric power in part of its motive power have been put into practical use in view of environmental problems.

For an electrode of the lithium ion secondary battery, an application method involving dispersing an electrode active material, a binder, and a conductive assistant in a solvent to provide a slurry, applying the slurry onto a current collector, and drying the slurry, to thereby produce an electrode active material mixture layer on the current collector is generally used. As the amounts of the binder and the conductive assistant among the constituent components of the electrode active material mixture layer become smaller, a battery capacity per unit mass can be increased more, and a battery with a higher capacity is obtained. Meanwhile, the binder is a component that binds a particle and a particle, and a particle and the current collector, and hence when binding is insufficient due to lack of the binder or the like, the electrode mixture layer is liable to be cracked or peeled. This not only causes a reduction in battery capacity, but also may cause an internal short circuit in the battery. Accordingly, it has been difficult to produce an electrode having an extremely small content of the binder by the application method.

Meanwhile, there have been proposed methods each involving causing fine particles of an electrode active material to collide with a current collector at high speed by a cold spray method or an aerosol deposition method, to thereby produce an electrode comprising an electrode mixture layer free of a binder (see, for example, Patent Literatures 1 and 2). However, those methods each have problems of the necessity for a large device, large energy consumption, a low film formation speed and in turn low productivity, a high risk of fluctuation in composition, and the like. In addition, the cold spray method and the aerosol deposition method can each be applied to an electrode active material having a relatively high hardness, but in the case of an organosulfur electrode active material, which is an electrode active material having a low hardness, it is difficult to produce a thick electrode mixture layer.

Meanwhile, the organosulfur electrode active material, which is obtained by subjecting a mixture of an organic compound and sulfur to heat treatment under a non-oxidizing atmosphere, is known as an electrode active material which has a high charge-discharge capacity and in which the charge-discharge capacity is less reduced along with repetition of charging and discharging (see, for example, Patent Literatures 3 to 15). The organosulfur electrode active material has been investigated mainly as a positive electrode active material, but can be used as a negative electrode active material (see, for example, Patent Literatures 11 and 12). However, in electrodes each manufactured by the application method through use of the organosulfur electrode active material as an electrode active material, an electrode in which the content of a binder in an electrode active material mixture layer is 0.4 mass % or less is unknown. In addition, the organosulfur electrode active material has a hardness insufficient for application of the cold spray method or the aerosol deposition method.

CITATION LIST

Patent Literature

[PTL 1] JP 2005-310502 A
[PTL 2] JP 2008-184647 A
[PTL 3] JP 2003-151550 A
[PTL 4] WO 2010/044437 A1
[PTL 5] JP 2011-028948 A
[PTL 6] JP 2011-170991 A
[PTL 7] JP 2012-099342 A
[PTL 8] JP 2012-150933 A
[PTL 9] JP 2012-150934 A
[PTL 10] WO 2012/114651 A1
[PTL 11] JP 2014-096326 A
[PTL 12] JP 2014-096327 A
[PTL 13] JP 2015-092449 A
[PTL 14] WO 2016/158675 A1
[PTL 15] WO 2016/159212 A1

SUMMARY OF INVENTION

Technical Problem

An object of the present invention is to provide an electrode for a non-aqueous electrolyte secondary battery comprising an electrode active material mixture layer having a small content of a binder in order to increase a charge-discharge capacity per unit mass of the electrode.

Solution to Problem

The inventors of the present invention made extensive investigations on the above-mentioned problems, and as a result, found that the problems can be solved by using an organosulfur electrode active material as an electrode active material. Thus, the inventors completed the present invention. That is, according to one embodiment of the present invention, there is provided an electrode for a non-aqueous electrolyte secondary battery, comprising: a current collector; and an electrode active material mixture layer containing an organosulfur electrode active material, a conductive assistant, and a binder, wherein the electrode active material mixture layer contains 0.01 mass % to 0.4 mass % of the binder with respect to a total mass of the electrode active material mixture layer, and wherein the electrode active material mixture layer is formed on the current collector.

Advantageous Effects of Invention

According to the present invention, the electrode for a non-aqueous electrolyte secondary battery comprising the electrode active material mixture layer (hereinafter also referred to as "electrode mixture layer") having a small content of the binder can be provided, and a charge-discharge capacity per unit mass of the electrode can be increased.

DESCRIPTION OF EMBODIMENTS

In the present invention, an organosulfur electrode active material is used as an electrode active material. In the present invention, the "organosulfur electrode active material" refers to a compound that has a sulfur-carbon bond, can store and release a lithium ion, and can be used as an electrode active material of a secondary battery. The organosulfur electrode active material is a compound obtained by subjecting a mixture of an organic compound and sulfur to heat treatment under a non-oxidizing atmosphere, and examples thereof include sulfur-modified polyacrylonitrile, a sulfur-modified elastomer compound, a sulfur-modified polynuclear aromatic compound, a sulfur-modified pitch compound, a polythienoacene compound, a sulfur-modified polyether compound, a sulfur-modified polyamide compound, a sulfur-modified aliphatic hydrocarbon oxide, and carbon polysulfide.

The sulfur-modified polyacrylonitrile is a compound obtained by subjecting polyacrylonitrile and elemental sulfur to heat treatment in a non-oxidizing atmosphere. Polyacrylonitrile may be a homopolymer of acrylonitrile, or may be a copolymer of acrylonitrile and different monomer(s). In the case where polyacrylonitrile is the copolymer, battery performance is reduced when the content of acrylonitrile is reduced. Accordingly, the content of acrylonitrile in the copolymer is preferably at least 90 mass % or more. Examples of the different monomer(s) include acrylic acid, vinyl acetate, N-vinyl formamide, and N,N'-methylenebisacrylamide.

The blending ratio between polyacrylonitrile and elemental sulfur in the heat treatment is as follows: preferably 100 parts by mass to 1,500 parts by mass, more preferably 150 parts by mass to 1,000 parts by mass of elemental sulfur with respect to 100 parts by mass of polyacrylonitrile. A temperature of the heat treatment is preferably from 250° C. to 550° C., more preferably from 350° C. to 450° C. Unreacted elemental sulfur causes a reduction in cycle characteristics of a secondary battery, and is hence preferably removed from the sulfur-modified polyacrylonitrile by heating, washing with a solvent, and the like after the heat treatment. The content of sulfur in the sulfur-modified polyacrylonitrile is preferably from 25 mass % to 70 mass %, more preferably from 30 mass % to 55 mass % because a high charge-discharge capacity is obtained. The content of sulfur in the organosulfur electrode active material may be calculated from analysis results using a CHN analyzer capable of analyzing sulfur and oxygen.

The weight average molecular weight of polyacrylonitrile to be used in the present invention is not particularly limited, and commercially available polyacrylonitrile may be used.

The sulfur-modified elastomer compound is a compound obtained by subjecting a rubber and elemental sulfur to heat treatment in a non-oxidizing atmosphere. Examples of the rubber include a natural rubber, an isoprene rubber, a butadiene rubber, a styrene butadiene rubber, and an acrylonitrile butadiene rubber. Those rubbers may be used alone or in combination thereof. The rubber serving as a raw material may be a vulcanized rubber or a rubber before vulcanization.

The blending ratio between the rubber and elemental sulfur in the heat treatment is as follows: preferably 100 parts by mass to 1,500 parts by mass, more preferably 150 parts by mass to 1,000 parts by mass of elemental sulfur with respect to 100 parts by mass of the rubber. One or more kinds of known vulcanization accelerators may be added during the heat treatment. The amount of the vulcanization accelerator to be added is preferably from 1 part by mass to 250 parts by mass, more preferably from 5 parts by mass to 50 parts by mass with respect to 100 parts by mass of the rubber. A temperature of the heat treatment is preferably from 250° C. to 550° C., more preferably from 300° C. to 450° C. Unreacted elemental sulfur causes a reduction in cycle characteristics of a secondary battery, and is hence preferably removed from the sulfur-modified elastomer compound by heating, washing with a solvent, and the like. The content of sulfur in the sulfur-modified elastomer compound is preferably from 40 mass % to 70 mass %, more preferably from 45 mass % to 60 mass % because a high charge-discharge capacity is obtained.

The sulfur-modified polynuclear aromatic compound is a compound obtained by subjecting a polynuclear aromatic compound and elemental sulfur to heat treatment in a non-oxidizing atmosphere. Examples of the polynuclear aromatic compound include benzene-based aromatic compounds, such as naphthalene, anthracene, tetracene, pentacene, phenanthrene, chrysene, picene, pyrene, benzopyrene, perylene, and coronene. Examples thereof also include: an aromatic compound in which part of the benzene-based aromatic compound is a five-membered ring; and a heteroatom-containing heteroaromatic compound in which part of carbon atoms of the aromatic compound is substituted with sulfur, oxygen, nitrogen, or the like. Further, those polynuclear aromatic compounds may each have a substituent, such as a chain or branched alkyl group having 1 to 12 carbon atoms, an alkoxyl group, a hydroxyl group, a carboxyl group, an amino group, an aminocarbonyl group, an aminothio group, a mercaptothiocarbonylamino group, or a carboxyalkylcarbonyl group.

The polynuclear aromatic compound may be a compound having a repeating structure of an aromatic moiety and a chain hydrocarbon moiety. Examples of the aromatic moiety of the compound having a repeating structure of an aromatic moiety and a chain hydrocarbon moiety include, in addition to the above-mentioned compounds, benzene, pyrrolidine, pyrrole, pyridine, imidazole, pyrrolidone, tetrahydrofuran, triazine, thiophene, oxazole, thiazole, thiadiazole, triazole, phosphole, and silole. Two or more aromatic moieties may be condensed, and those aromatic moieties and, for example, cyclopentane, cyclohexane, pyrrolidine, or tetrahydrofuran may be condensed. In addition, those aromatic moieties may each have a substituent, such as a chain or branched alkyl group having 1 to 12 carbon atoms, an alkoxyl group, a hydroxyl group, a carboxyl group, an amino group, an aminocarbonyl group, an aminothio group, a mercaptothiocarbonylamino group, or a carboxyalkylcarbonyl group.

Examples of the chain hydrocarbon moiety of the compound having a repeating structure of an aromatic moiety and a chain hydrocarbon moiety include linear or branched chain hydrocarbons, such as an alkylene group, an alkenylene group, and an alkynylene group. The chain hydrocarbon moiety has preferably 2 to 20, more preferably 3 to 10, still more preferably 4 to 8 carbon atoms. An alkylene group or an alkenylene group is preferred in terms of handleability and economic efficiency. Of those, a butane-1,4-diyl group, a hexane-1,6-diyl group, an octane-1,8-diyl group, a vinylene group, and a 1,3-butadiene-1,4-diyl group, and structural isomers thereof are preferred.

The blending ratio between the polynuclear aromatic compound and elemental sulfur in the heat treatment is as follows: preferably 100 parts by mass to 1,500 parts by mass, more preferably 150 parts by mass to 1,000 parts by mass of elemental sulfur with respect to 100 parts by mass of the polynuclear aromatic compound. A temperature of the heat treatment is preferably from 250° C. to 550° C., more preferably from 300° C. to 450° C. Unreacted elemental sulfur causes a reduction in cycle characteristics of a secondary battery, and is hence preferably removed from the sulfur-modified polynuclear aromatic compound by heating, washing with a solvent, and the like. The content of sulfur in the sulfur-modified polynuclear aromatic compound is preferably from 40 mass % to 70 mass %, more preferably from 45 mass % to 60 mass % because a high charge-discharge capacity is obtained.

The sulfur-modified pitch compound is a compound obtained by subjecting pitches and elemental sulfur to heat treatment in a non-oxidizing atmosphere. Examples of the pitches include petroleum pitch, coal pitch, mesophase pitch, asphalt, coal tar, coal tar pitch, organic synthesized pitch obtained by polycondensation of a polycondensed aromatic hydrocarbon compound, and organic synthesized pitch obtained by polycondensation of a heteroatom-containing polycondensed aromatic hydrocarbon compound. The pitches are a mixture of various compounds, and contain a polycondensed aromatic compound. The pitches may contain one kind or a plurality kinds of polycondensed aromatic compounds. The polycondensed aromatic compound may have nitrogen or sulfur in addition to carbon and hydrogen in a ring thereof. Accordingly, a main component of coal pitch is considered to be a mixture of a polycondensed aromatic hydrocarbon consisting only of carbon and hydrogen and a heteroaromatic compound having nitrogen, sulfur, or the like in a condensed ring thereof.

The blending ratio between the pitches and elemental sulfur in the heat treatment is as follows: preferably 100 parts by mass to 1,000 parts by mass, more preferably 150 parts by mass to 500 parts by mass of elemental sulfur with respect to 100 parts by mass of the pitches. A temperature of the heat treatment is preferably from 300° C. to 500° C., more preferably from 350° C. to 500° C. Unreacted elemental sulfur causes a reduction in cycle characteristics of a secondary battery, and is hence preferably removed from the sulfur-modified pitch compound by heating, washing with a solvent, and the like. The content of sulfur in the sulfur-modified pitch compound is preferably from 25 mass % to 70 mass %, more preferably from 30 mass % to 60 mass % because a high charge-discharge capacity is obtained.

The polythienoacene compound is a compound having a polythienoacene structure containing sulfur represented by the following general formula (I):

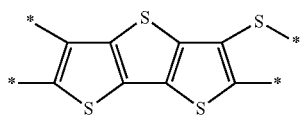

(1)

The polythienoacene compound may be obtained by subjecting an aliphatic polymer compound having a linear structure, such as polyethylene, or a polymer compound having a thiophene structure, such as polythiophene, and elemental sulfur to heat treatment in a non-oxidizing atmosphere.

When the aliphatic polymer compound having a linear structure is used as a raw material for the polythienoacene compound, the blending ratio between the aliphatic polymer compound and elemental sulfur is as follows: preferably 100 parts by mass to 2,000 parts by mass, more preferably 150 parts by mass to 1,000 parts by mass of elemental sulfur with respect to 100 parts by mass of the aliphatic polymer compound. In addition, when the polymer compound having a thiophene structure is used as the raw material, the ratio between the polymer compound having a thiophene structure and elemental sulfur is as follows: preferably 100 parts by mass to 1,000 parts by mass, more preferably 150 parts by mass to 800 parts by mass of elemental sulfur with respect to 100 parts by mass of the polymer compound having a thiophene structure. A temperature of the heat treatment is preferably from 300° C. to 600° C., more preferably from 350° C. to 500° C. Unreacted elemental sulfur causes a reduction in cycle characteristics of a secondary battery, and is hence preferably removed from the polythienoacene compound by heating, washing with a solvent, and the like. The content of sulfur in the polythienoacene compound is preferably from 30 mass % to 80 mass %, more preferably from 40 mass % to 70 mass % because a high charge-discharge capacity is obtained.

The sulfur-modified polyether compound is a compound obtained by subjecting a polyether compound and elemental sulfur to heat treatment in a non-oxidizing atmosphere. Examples of the polyether compound include polyethylene glycol, polypropylene glycol, an ethylene oxide/propylene oxide copolymer, and polytetramethylene glycol. The polyether compound may have an alkyl ether group, an alkyl phenyl ether group, or an acyl group at a terminal thereof, or may be an ethylene oxide adduct of a polyol, such as glycerin or sorbitol.

The blending ratio between the polyether compound and elemental sulfur in the heat treatment is as follows: preferably 100 parts by mass to 1,000 parts by mass, more preferably 200 parts by mass to 500 parts by mass of elemental sulfur with respect to 100 parts by mass of the polyether compound. A temperature of the heat treatment is preferably from 250° C. to 500° C., more preferably from 300° C. to 450° C. Unreacted elemental sulfur causes a reduction in cycle characteristics of a secondary battery, and is hence preferably removed from the sulfur-modified polyether compound by heating, washing with a solvent, and the like. The content of sulfur in the sulfur-modified polyether compound is preferably from 30 mass % to 75 mass %, more preferably from 40 mass % to 70 mass % because a high charge-discharge capacity is obtained.

The sulfur-modified polyimide compound is an organosulfur compound having a carbon skeleton derived from a polymer having an amide bond, and is specifically a compound obtained by subjecting an aminocarboxylic acid compound and elemental sulfur, or a polyamine compound, a polycarboxylic acid compound, and elemental sulfur to heat treatment in a non-oxidizing atmosphere.

In the present invention, the "aminocarboxylic acid compound" refers to a compound having one amino group and at least one carboxyl group in a molecule thereof. Examples of the aminocarboxylic acid compound include: aminobenzoic acids, such as 3,4-diaminobenzoic acid, 3,5-diaminobenzoic acid, p-aminobenzoic acid, and m-aminobenzoic acid; 4-aminophenylacetic acid, 3-aminophenylacetic acid, 3-(4-aminophenyl)propionic acid, 3-aminopropionic acid, 4-aminobutanoic acid, 5-aminopentanoic acid, and 2,5-diaminopentanoic acid; and amino acids, such as alanine, arginine, asparagine, aspartic acid, cysteine, glutamine, glutamic acid, glycine, histidine, isoleucine, leucine, lysine, methionine, phenylalanine, proline, serine, threonine, tryptophan, tyrosine, valine, theanine, tricholomic acid, kainic acid, domoic acid, ibotenic acid, and acromelic acid.

In the present invention, the polyamine compound refers to a compound having at least two amino groups in a molecule thereof. Examples of the polyamine compound include urea, ethylenediamine, diethylenetriamine, putrescine, cadaverine, hexamethylenediamine, o-phenylenediamine, m-phenylenediamine, p-phenylenediamine, 4-aminobenzenemethanamine, 4-aminobenzeneethanamine, melamine, 1,2,4-triaminobenzene, 1,3,5-triaminobenzene, and benzoguanamine.

In the present invention, the polycarboxylic acid compound refers to a compound having at least two carboxyl groups in a molecule thereof. Examples of the polycarboxylic acid compound include terephthalic acid, fumaric acid, tartaric acid, maleic acid, benzene-1,3-dicarboxylic acid, phthalic acid, oxalic acid, malonic acid, succinic acid, glutaric acid, adipic acid, pimelic acid, suberic acid, azelaic acid, sebacic acid, and ethylenediamine tetraacetic acid. In addition, examples thereof also include phthalic anhydride and maleic anhydride, and the compound may also be an acid anhydride. When the sulfur-modified polyamide compound is produced by using the polyamine compound and the polycarboxylic acid compound, the ratio between the polyamine compound and the polycarboxylic acid compound is preferably from 0.9 to 1.1 in terms of a molar ratio.

The ratio between the aminocarboxylic acid compound and elemental sulfur in the heat treatment is as follows: preferably 100 parts by mass to 500 parts by mass, more preferably 150 parts by mass to 400 parts by mass of elemental sulfur with respect to 100 parts by mass of the aminocarboxylic acid compound. The blending ratio among the polyamine compound, 0.1.0 the polycarboxylic acid compound, and elemental sulfur is as follows: preferably 100 parts by mass to 500 parts by mass, more preferably 150 parts by mass to 400 parts by mass of elemental sulfur with respect to 100 parts by mass of the total mass of the polyamine compound and the polycarboxylic acid compound. A temperature of the heat treatment is preferably from 250° C. to 600° C., more preferably from 350° C. to 500° C. Unreacted elemental sulfur causes a reduction in cycle characteristics of a secondary battery, and is hence preferably removed from the sulfur-modified polyamide compound by heating, washing with a solvent, and the like. The content of sulfur in the sulfur-modified polyamide compound is preferably from 40 mass % to 70 mass %, more preferably from 45 mass % to 60 mass % because a high charge-discharge capacity is obtained.

The sulfur-modified aliphatic hydrocarbon oxide is a compound obtained by subjecting an aliphatic hydrocarbon oxide and elemental sulfur to heat treatment in a non-oxidizing atmosphere. In the present invention, the "aliphatic hydrocarbon oxide" refers to a compound having an aliphatic hydrocarbon skeleton and at least one group selected from the group consisting of: a hydroxyl group; a carbonyl group; a carboxyl group; and an epoxy group, in which the hydrocarbon skeleton may have an unsaturated bond. The aliphatic hydrocarbon skeleton of the aliphatic hydrocarbon oxide may be linear or branched, but is preferably linear because a high charge-discharge capacity is obtained. The aliphatic hydrocarbon oxide has preferably 4 to 12, more preferably 6 to 10 carbon atoms because a high charge-discharge capacity is obtained. An oxygen atom in the aliphatic hydrocarbon oxide is desorbed therefrom through the heat treatment with elemental sulfur, and hence a ratio of the number of carbon atoms to the number of oxygen atoms in the aliphatic hydrocarbon oxide is preferably 3 or more, more preferably 4 or more.

The aliphatic hydrocarbon oxide is preferably, for example: an alcohol compound, such as 1-butanol, 2-butanol, 1-pentanol, 3-pentanol, 1-hexanol, 1-heptanol, 1-octanol, 1-nonanol, 1-decanol, 1-butanol, 1-pentanol, 1-hexanol, 1-heptanol, 1-octanol, 2-octanol, 1-nonanol, or 1-decanol; an aldehyde compound, such as butanal, pentanal, hexanal, heptanal, octanal, nonanal, or decanal; a ketone compound, such as methyl ethyl ketone, diethyl ketone, or methyl hexyl ketone; a carboxylic acid compound, such as octanoic acid, nonanoic acid, or decanoic acid; or an epoxy compound, such as 1,2-butane oxide, 1,2-hexane oxide, 1,2-octane oxide, or 1,2-decane oxide.

The blending ratio between the aliphatic hydrocarbon oxide and elemental sulfur in the heat treatment is as follows: preferably 100 parts by mass to 1,000 parts by mass, more preferably 200 parts by mass to 500 parts by mass of elemental sulfur with respect to 100 parts by mass of the aliphatic hydrocarbon oxide. A temperature of the heat treatment is preferably from 300° C. to 500° C., more preferably from 350° C. to 450° C. When the temperature of the heat treatment is higher than the boiling point of the aliphatic hydrocarbon oxide, the sulfur-modified aliphatic hydrocarbon oxide is preferably produced while the aliphatic hydrocarbon oxide is refluxed. Unreacted elemental sulfur causes a reduction in cycle characteristics of a secondary battery, and is hence preferably removed from the sulfur-modified aliphatic hydrocarbon oxide by heating, washing with a solvent, and the like. The content of sulfur in the sulfur-modified aliphatic hydrocarbon oxide is preferably from 45 mass % to 75 mass %, more preferably from 50 mass % to 70 mass % because a high charge-discharge capacity is obtained.

The carbon polysulfide is a compound represented by the general formula $(CS_x)_n$ (where "x" represents from 0.5 to 2, and "n" represents a number of 4 or more), and may be obtained, for example, by subjecting a precursor, which is obtained by causing a composite of an alkali metal sulfide, such as sodium sulfide, and elemental sulfur to react with a halogenated unsaturated hydrocarbon, such as hexachlorobutadiene, to heat treatment. A temperature of the heat treatment is preferably from 320° C. to 400° C. The content of sulfur in the carbon polysulfide compound is preferably from 65 mass % to 75 mass % because a high charge-discharge capacity is obtained.

When the heat treatment of the organic compound and sulfur is performed under a non-oxidizing atmosphere, the non-oxidizing atmosphere may be an atmosphere in which a gas phase has an oxygen concentration of 5 vol % or less, preferably 2 vol % or less, more preferably an atmosphere substantially free of oxygen, for example, an inert gas atmosphere of nitrogen, helium, argon, or the like, or a sulfur gas atmosphere.

The organic compound and sulfur serving as raw materials for the organosulfur electrode active material are finely pulverized as required, mixed with each other, and subjected to heat treatment. The organic compound and sulfur are preferably mixed with each other even during the heat treatment because an organosulfur electrode active material having less variation in its quality is obtained. As a mixing method, there are given: container rotating-type mixing in which mixing is performed by rotating a heating container in itself; and stirring mixing in which mixing is performed with a stirring blade inserted in a heating container. As a heat treatment device of the container rotating-type mixing, there is given a rotary kiln, and as a heat treatment device of the stirring mixing, there is given a heat treatment device having a screw blade, a helical ribbon blade, or the like. The heat treatment device of the stirring mixing may be a vertical device having a bottom, or may be a horizontal device having a tunnel structure or the like. As the mixing method in the heat treatment, the heat treatment device of the container rotating-type mixing is preferred because an active material excellent in battery characteristics is obtained. The reason why the active material excellent in battery characteristics is obtained when the device of the container rotating-type mixing is used is unknown, but it is presumed that, in the device of the stirring mixing, a load, such as pressure, is applied to an intermediate of the organosulfur electrode active material by the stirring blade during the heat treatment.

The organosulfur electrode active material preferably has a particle diameter of from 0.1 µm to 50 µm in terms of an average particle diameter. The particle diameter is a diameter on a volume basis, and the diameters of secondary particles are measured by a laser diffraction light scattering method. In the present invention, the "average particle diameter" refers to a 50% particle diameter ($D_{50}$) measured by a laser diffraction light scattering method. It requires great labor to reduce the average particle diameter of the organosulfur electrode active material to less than 0.1 µm, but a further improvement in battery performance cannot be expected. When the average particle diameter of the organosulfur electrode active material is more than 50 µm, peeling or the like of an electrode mixture layer may be liable to occur. The organosulfur electrode active material has an average particle diameter of more preferably from 0.5 µm to 30 µm, still more preferably from 1 µm to 20 µm.

The organosulfur electrode active material preferably has a specific surface area of from 0.5 $m^2$/g to 30 $m^2$/g. In the present invention, the "specific surface area" refers to a specific surface area measured by a Brunauer-Emmett-Teller (BET) method. When the organosulfur electrode active material has a specific surface area of less than 0.5 $m^2$/g, a sufficient charge-discharge capacity may not be obtained. When the organosulfur electrode active material has a specific surface area of more than 30 $m^2$/g, a binding property becomes insufficient and excellent cycle characteristics may not be obtained. The organosulfur electrode active material has a specific surface area of more preferably from 1 $m^2$/g to 20 $m^2$/g, still more preferably from 3 $m^2$/g to 15 $m^2$/g.

As a conductive assistant of an electrode comprising an electrode mixture layer containing the organosulfur electrode active material, one known as a conductive assistant of an electrode for a non-aqueous electrolyte secondary battery may be used, and specific examples thereof include: carbon materials, such as natural graphite, artificial graphite, carbon black, ketjen black, acetylene black, channel black, furnace black, lamp black, thermal black, a carbon nanotube, a vapor grown carbon fiber (VGCF), flake graphite, expandable graphite, graphene, fullerene, and needle coke; metal powders, such as aluminum powder, nickel powder, and titanium powder; conductive metal oxides, such as zinc oxide and titanium oxide; and sulfides, such as $La_2S_3$, $Sm_2S_3$, $Ce_2S_3$, and $TiS_2$. The conductive assistant has a particle diameter of preferably from 0.0001 µm to 50 µm, more preferably from 0.01 µm to 40 µm in terms of an average particle diameter. When the content of the conductive assistant is too small, the conductivity of the electrode mixture layer becomes insufficient, and a sufficient capacity may not be obtained. When the content of the conductive assistant is too large, the content of the organosulfur electrode active material is reduced, resulting in a reduction in capacity. Accordingly, the content of the conductive assistant is preferably from 1 part by mass to 30 parts by mass, more preferably from 2 parts by mass to 20 parts by mass with respect to 100 parts by mass of the organosulfur electrode active material.

The electrode mixture layer of the electrode for a non-aqueous electrolyte secondary battery of the present invention contains 0.4 mass % or less of a binder. Examples of the binder that may be used in the electrode of the present invention include: polydiene-based binders, such as an ethylene-propylene-diene rubber, a styrene-butadiene rubber, a butadiene rubber, an acrylonitrile butadiene rubber, and a styrene-isoprene rubber; polycarboxylic acid-based binders, such as polyacrylic acid, polymethyl methacrylate, polyacrylate, an ethylene-acrylic acid copolymer, and an ethylene-methacrylic acid copolymer; polyolefin-based binders, such as polyethylene, polypropylene, and a propylene-α-olefin copolymer; fluorinated polymer-based binders, such as polyvinylidene fluoride and polytetrafluoroethylene; polydiene-based binders, such as a butadiene rubber, a styrene-butadiene rubber, an acrylonitrile butadiene rubber, a styrene-isoprene rubber, and an ethylene-propylene-diene rubber; polyether-based binders, such as polyethylene oxide and modified polyphenylene oxide; amide imide-based binders, such as a polyamide resin, a polyimide resin, and a polyamide imide resin; cellulose-based binders, such as carboxymethyl cellulose, methyl cellulose, hydroxymethyl cellulose, ethyl cellulose, a cellulose nanofiber, and a cellulose nanocrystal; polyvinyl alcohol-based binders, such as polyvinyl alcohol, an ethylene-vinyl alcohol copolymer, and polyvinyl acetate; polyacrylonitrile-based binders, such as polyacrylonitrile; polyester-based binders, such as polyester polyol; and polyurethane-based binders. When the binder has an acid group, such as a carboxyl group, the binder may be neutralized with an alkali metal, such as lithium, sodium, or potassium.

Those binders may be used alone or in combination thereof. Of those, a polyolefin-based binder, a polydiene-based binder, a polycarboxylic acid-based binder, a polyether-based binder, a polyvinyl alcohol-based binder, a polyacrylonitrile-based binder, a cellulose-based binder, a polyester-based binder, and a polyurethane-based binder are preferred as the binder because a high binding property is obtained even in a small amount.

When the content of the binder in the electrode mixture layer is small, a sufficient binding property is not obtained, and hence the electrode mixture layer of the present invention contains 0.01 mass % or more of the binder with respect to the total mass thereof. Meanwhile, when the content of the binder in the electrode mixture layer is large, an electric capacity of the electrode is reduced, and hence the electrode mixture layer contains 0.4 mass % or less of the binder with respect to the total mass thereof. In addition, the content of the binder in the electrode mixture layer is preferably from 0.05 mass % to 0.4 mass %, more preferably from 0.1 mass % to 0.4 mass %.

In the electrode of the present invention, the electrode mixture layer is formed by applying a slurry, which is prepared by adding the organosulfur electrode active material and the conductive assistant to a solvent, and further adding the binder thereto, onto a current collector, and drying the slurry. Examples of the solvent include dimethyl carbonate, acetonitrile, tetrahydrofuran, N-methylpyrrolidone, N,N-dimethylformamide, methyl ethyl ketone, cyclohexanone, ethyl acetate, butyl acetate, tetrahydrofuran, ethanol, and water. Of those, N-methylpyrrolidone, ethanol, and water are preferred. As a method of preparing the slurry, for example, a ball mill, a planetary centrifugal mixer, a planetary mixer, or a disper may be used.

The thickness of the electrode mixture layer on one surface is preferably from 10 μm to 500 μm, more preferably from 40 μm to 300 μm because, when the thickness of the electrode mixture layer is too small, a sufficient charge-discharge capacity is not obtained, and when the thickness of the electrode mixture layer is too large, diffusion of an alkali metal ion into the electrode mixture layer becomes insufficient, or the electrode mixture layer is liable to be cracked or peeled.

A conductive material, such as titanium, a titanium alloy, aluminum, an aluminum alloy, copper, nickel, stainless steel, nickel-plated stainless steel, or carbon, is used as the current collector. The thickness of the current collector is generally from about 5 μm to about 50 μm, and is, for example, from about 7 μm to about 30 μm in the case of aluminum or the aluminum alloy and from about 5 μm to about 15 μm in the case of copper or the copper alloy.

In the electrode comprising the electrode mixture layer containing the organosulfur electrode active material, the electrode may be subjected to press processing as required after the drying. As a method for the press processing, there are given, for example, a mold press method and a roll press method.

The electrode comprising the electrode mixture layer containing the organosulfur electrode active material may be used as a positive electrode or a negative electrode of a non-aqueous electrolyte secondary battery of the present invention. When the electrode comprising the electrode mixture layer containing the organosulfur electrode active material is used as a positive electrode of a lithium ion secondary battery, an electrode comprising a known negative electrode active material may be used as a negative electrode thereof. When the electrode comprising the electrode mixture layer containing the organosulfur electrode active material is used as a negative electrode of a lithium ion secondary battery, an electrode comprising a known positive electrode active material may be used as a positive electrode thereof. In the present invention, a negative electrode in the case of using, as a positive electrode, the electrode comprising the organosulfur electrode active material as an electrode active material, and a positive electrode in the case of using, as a negative electrode, the electrode comprising the organosulfur electrode active material as an electrode active material are each referred to as "counter electrode".

Examples of the known negative electrode active material, which is used when the electrode comprising the organosulfur electrode active material as an electrode active material is used as a positive electrode, and the counter electrode is a negative electrode, include, in the case of a lithium ion secondary battery, natural graphite, artificial graphite, non-graphitizable carbon, graphitizable carbon, lithium, a lithium alloy, silicon, a silicon alloy, silicon oxide, tin, a tin alloy, tin oxide, phosphorus, germanium, indium, copper oxide, antimony sulfide, titanium oxide, iron oxide, manganese oxide, cobalt oxide, nickel oxide, lead oxide, ruthenium oxide, tungsten oxide, and zinc oxide, and as well, composite oxides, such as $LiVO_2$, $Li_2VO_4$, $Li_4Ti_5O_{12}$, and niobium titanium-based oxide. Those negative electrode active materials may be used alone or in combination thereof.

In the case of a sodium ion secondary battery, the negative electrode active material free of a lithium atom or the negative electrode active material in which a lithium atom is replaced with a sodium atom among the above-mentioned negative electrode active materials in the case of a lithium ion secondary battery may be used. When the negative electrode active material is lithium or a lithium alloy, or sodium or a sodium alloy, the negative electrode active material in itself may be used as an electrode without use of the current collector.

Examples of the known positive electrode active material, which is used when the electrode comprising the organosulfur electrode active material as an electrode active material is used as a negative electrode, and the counter electrode is a positive electrode, include, in the case of a lithium ion secondary battery, a composite oxide of lithium and a transition metal, a lithium-containing transition metal phosphate compound, and a lithium-containing silicate compound. A transition metal in the composite oxide of lithium and a transition metal is preferably, for example, vanadium, titanium, chromium, manganese, iron, cobalt, nickel, or copper. Specific examples of the composite oxide of lithium and a transition metal include: composite oxides of lithium and cobalt, such as $LiCoO_2$; composite oxides of lithium and nickel, such as $LiNiO_2$; composite oxides of lithium and manganese, such as $LiMnO_2$, $LiMn_2O_4$, and $Li_2MnO_3$; and compounds obtained by substituting part of primary transition metal atoms of these composite oxides of lithium and transition metals with another metal, such as aluminum, titanium, vanadium, chromium, manganese, iron, cobalt, lithium, nickel, copper, zinc, magnesium, gallium, or zirconium. Specific examples of the substituted compounds include $Li_{1.1}Mn_{1.8}Mg_{0.1}O_4$, $Li_{1.1}Mn_{1.85}Al_{0.05}O_4$, $LiNi_{0.5}Co_{0.2}Mn_{0.3}O_2$, $LiNi_{0.8}Co_{0.1}Mn_{0.1}O_2$, $LiNi_{0.5}Mn_{0.5}O_2$, $LiNi_{0.80}Co_{0.17}Al_{0.03}O_2$, $LiNi_{0.80}Co_{0.15}Al_{0.05}O_2$, $LiNi_{1/3}Co_{1/3}Mn_{1/3}O_2$, $LiNi_{0.6}Co_{0.2}Mn_{0.2}O_2$, $LiMn_{1.8}Al_{0.2}O_4$, $LiMn_{1.5}Ni_{0.5}O_4$, and $Li_2MnO_3$—$LiMO_2$ (M=Co, Ni, or Mn). A transition metal in the lithium-containing transition metal phosphate compound is preferably vanadium, titanium, manganese, iron, cobalt, nickel, or the like, and specific examples of the compound include: iron phosphate compounds, such as $LiFePO_4$ and $LiMn_xFe_{1-x}PO_4$; cobalt phosphate compounds, such as $LiCoPO_4$; compounds obtained by substituting part of primary transition metal atoms of these lithium-containing transition metal phosphate compounds with another metal, such as aluminum, titanium, vanadium, chromium, manganese, iron, cobalt, lithium, nickel, copper, zinc, magnesium, gallium, zirconium, niobium; and vanadium phosphate compounds, such as $Li_3V_2(PO_4)_3$. An example of the lithium-containing silicate compound is $Li_2FeSiO_4$. Those compounds may be used alone or in combination thereof.

In the case of a sodium ion secondary battery, the positive electrode active material in which a lithium atom is replaced with a sodium atom among the above-mentioned positive electrode active materials in the case of a lithium ion secondary battery may be used.

The counter electrode may be produced by replacing the above-mentioned organosulfur electrode active material with the above-mentioned known negative electrode active material or known positive electrode active material. When the electrode comprising the organosulfur electrode active material as an electrode active material is used as a positive electrode, and the counter electrode is a negative electrode comprising a compound free of lithium as a negative electrode active material, each of the positive electrode and the negative electrode is free of lithium. Accordingly, lithium predoping treatment of inserting lithium into any one or both of the negative electrode and the positive electrode in advance is required. A lithium predoping method that follows a known method may be adopted. For example, when the negative electrode is doped with lithium, there are given: a method of inserting lithium by an electrolysis doping method in which a half battery is assembled by using metal lithium as a counter electrode, and the negative electrode is electrochemically doped with lithium; and a method of inserting lithium by a bonding predoping method in which a metal lithium foil is bonded to the negative electrode, and then the electrode is left in an electrolytic solution and doped with lithium through utilization of diffusion of lithium into the electrode. In addition, also when the positive electrode is doped with lithium, the above-mentioned electrolysis doping method or bonding predoping method may be utilized.

As a non-aqueous electrolyte of the non-aqueous electrolyte secondary battery of the present invention, there are given, for example: a liquid electrolyte obtained by dissolving a supporting electrolyte in an organic solvent; a gel polymer electrolyte in which a supporting electrolyte is dissolved in an organic solvent and gelation is performed with a polymer; a pure polymer electrolyte which is free of an organic solvent and in which a supporting electrolyte is dispersed in a polymer; a hydride-based solid electrolyte; and an inorganic solid electrolyte.

In the case of the lithium ion secondary battery, for example, a hitherto known lithium salt is used as the supporting electrolyte to be used in the liquid electrolyte and the gel polymer electrolyte. Examples thereof include $LiPF_6$, $LiBF_4$, $LiAsF_6$, $LiCF_3SO_3$, $LiCF_3CO_2$, $LiN(CF_3SO_2)_2$, $LiN(C_2F_5SO_2)_2$, $LiN(SO_2F)_2$, $LiC(CF_3SO_2)_3$, $LiB(CF_3SO_3)_4$, $LiB(C_2O_4)_2$, $LiBF_2(C_2O_4)$, $LiSbF_6$, $LiSiF_5$, $LiSCN$, $LiClO_4$, $LiCl$, $LiF$, $LiBr$, $LiI$, $LiAlF_4$, $LiAlCl_4$, $LiPO_2F_2$, and derivatives thereof. Of those, one or more kinds selected from the group consisting of $LiPF_6$, $LiBF_4$, $LiClO_4$, $LiAsF_6$, $LiCF_3SO_3$ or derivatives thereof, $LiN(CF_3SO_2)_2$, $LiN(C_2F_5SO_2)_2$, $LiN(SO_2F)_2$, and $LiC(CF_3SO_2)_2$ or derivatives thereof are preferably used. The content of the supporting electrolyte in the liquid electrolyte or the gel polymer electrolyte is preferably from 0.5 mol/L to 7 mol/L, more preferably from 0.8 mol/L to 1.8 mol/L.

Examples of the supporting electrolyte to be used in the pure polymer electrolyte include, in the case of the lithium ion secondary battery, $LiN(CF_3SO_2)_2$, $LiN(C_2F_5SO_2)_2$, $LiN(SO_2F)_2$, $LiC(CF_3SO_2)_3$, $LiB(CF_3SO_3)_4$, and $LiB(C_2O_4)_2$.

Examples of the hydride-based solid electrolyte include $LiBH_4$, $LiBH_4$—$LiI$, $LiBH_4$—$P_2S_5$, $LiAlH_4$, and $Li_3AlHE$.

Examples of the inorganic solid electrolyte include, in the case of the lithium ion secondary battery: phosphoric acid-based materials, such as $Li_{1+x}A_xB_{2-x}(PO_4)_3$ (A=Al, Ge, Sn, Hf, Zr, Sc, or Y, B=Ti, Ge, or Zn, 0<x<0.5), $LiMPO_4$ (M=Mn, Fe, Co, or Ni), and $Li_3PO_4$; composite oxides of lithium, such as $Li_3XO_4$ (X=As or V), $Li_{3+x}A_xB_{1-x}O_4$ (A=Si, Ge, or Ti, B=P, As, or V, 0<x<0.6), $Li_{4+x}A_xSi_{1-x}O_4$ (A=B, Al, Ga, Cr, or Fe, 0<x<0.4) (A=Ni or Co, 0<x<0.1), $Li_{4-3y}Al_ySiO_4$ (0<y<0.06), $Li_{4-2y}Zn_yGeO_4$ (0<y<0.25), $LiAlO_2$, $Li_2BO_4$, $Li_4XO_4$ (X=Si, Ge, or Ti), and lithium titanate ($LiTiO_2$, $LiTi_2O_4$, $Li_4TiO_4$, $Li_2TiO_3$, $Li_2Ti_3O_7$, or $Li_4Ti_5O_{12}$); compounds each containing lithium and a halogen atom, such as $LiBr$, $LiF$, $LiCl$, $LiPF_6$, and $LiBF_4$; compounds each containing lithium and a nitrogen atom, such as LIPON, $LiN(SO_2CF_3)_2$, $LiN(SO_2C_2F_5)_2$, $Li_3N$, and $LiN(SO_2C_3F_7)_2$; crystals each having a perovskite structure having lithium ion conductivity, such as $La_{0.55}Li_{0.35}TiO_3$; crystals each having a garnet-type structure, such as $Li_7$—$La_3Zr_2O_{13}$; glasses, such as $50Li_4SiO_4 \cdot 50Li_3BO_{33}$ and $90Li_3BO_3 \cdot 10Li_2SO_4$; lithium-phosphorus sulfide-based crystals, such as $70Li_2S \cdot 30P_2S_5$, $75Li_2S \cdot 25P_2S_5$, $Li_6PS_5Cl$, $Li_{9.54}Si_{1.74}P_{1.44}S_{11.7}Cl_{0.3}$, $Li_6PS_5P_{1.44}Cl_3$, $Li_{10}GeP_2S_{12}$, and $Li_{3.25}Ge_{0.25}P_{0.75}S_4$; lithium-phosphorus sulfide-based glasses, such as $30Li_2S \cdot 26B_2S_3 \cdot 44LiI$, $50Li_2S \cdot 17P_2S_5 \cdot 33LiBH$, $50Li_2S \cdot 50GeS_2$, $63Li_2S \cdot 36SiS_2 \cdot 1Li_3PO_4$, $57Li_2S \cdot 38SiS_2 \cdot 5Li_4SiO_4$, and $70Li_2S \cdot 50GeS_2$; and glass ceramics, such as $Li_7P_3S_{11}$, $Li_{3.25}P_{0.95}S_4$, $Li_{10}GeP_2S_{12}$, $Li_{9.6}P_3S_{12}$, and $Li_{9.54}Si_{1.74}P_{1.44}S_{11.7}Cl_{0.3}$. The inorganic solid electrolyte may be coated with the gel polymer electrolyte. In addition, when the inorganic solid electrolyte is used, a layer of the gel polymer electrolyte may be arranged between a layer of the inorganic solid electrolyte and an electrode.

In the case of a sodium ion secondary battery, the supporting electrolyte in which a lithium atom is replaced with a sodium atom among the above-mentioned supporting electrolytes in the case of a lithium ion secondary battery may be used.

As the organic solvent to be used for preparation of the liquid non-aqueous electrolyte to be used in the present invention, organic solvents generally used for the liquid non-aqueous electrolyte may be used alone or in combination thereof. Specific examples thereof include a saturated cyclic carbonate compound, a saturated cyclic ester compound, a sulfoxide compound, a sulfone compound, an amide compound, a saturated chain carbonate compound, a chain ether compound, a cyclic ether compound, and a saturated chain ester compound.

Of those organic solvents, the saturated cyclic carbonate compound, the saturated cyclic ester compound, the sulfoxide compound, the sulfone compound, and the amide compound each play a role in increasing the dielectric constant of the non-aqueous electrolyte by virtue of having a high specific dielectric constant, and the saturated cyclic carbonate compound is particularly preferred. Examples of such saturated cyclic carbonate compound include ethylene carbonate, 1,2-propylene carbonate, 1,3-propylene carbonate, 1,2-butylene carbonate, 1,3-butylene carbonate, and 1,1-dimethylethylene carbonate. Examples of the saturated cyclic ester compound include γ-butyrolactone, γ-valerolactone, γ-caprolactone, δ-hexanolactone, and δ-octanolactone. Examples of the sulfoxide compound include dimethyl sulfoxide, diethyl sulfoxide, dipropyl sulfoxide, diphenyl sulfoxide, and thiophene. Examples of the sulfone compound include dimethylsulfone, diethylsulfone, dipropylsulfone, diphenylsulfone, sulfolane (also referred as tetramethylene sulfone), 3-methylsulfolane, 3,4-dimethylsulfolane, 3,4-diphenymethylsulfolane, sulfolene, methylsulfolene, 3-ethylsulfolene, and 3-bromomethylsulfolene. Of those, sulfolane and tetramethylsulfolane are preferred. Examples of the amide compound include N-methylpyrrolidone, dimethylformamide, and dimethylacetamide.

Of the above-mentioned organic solvents, the saturated chain carbonate compound, the chain ether compound, the cyclic ether compound, and the saturated chain ester compound can each make battery characteristics, such as an output density, excellent by virtue of having the capability of reducing the viscosity of the non-aqueous electrolyte, the capability of increasing the mobility of an electrolyte ion, and the like. In addition, the saturated chain carbonate compound is particularly preferred because the compound has a low viscosity, and can improve the performance of the non-aqueous electrolyte at low temperature. Examples of the saturated chain carbonate compound include dimethyl carbonate, ethyl methyl carbonate, diethyl carbonate, ethyl butyl carbonate, methyl-t-butyl carbonate, diisopropyl carbonate, and t-butyl propyl carbonate. Examples of the chain ether compound or the cyclic ether compound include dimethoxyethane, ethoxymethoxyethane, diethoxyethane, tetrahydrofuran, dioxolane, dioxane, 1,2-bis(methoxycarbonyloxy)ethane, 1,2-bis(ethoxycarbonyloxy)ethane, 1,2-bis(ethoxycarbonyloxy)propane, ethylene glycol bis(trifluoroethyl)ether, propylene glycol bis(trifluoroethyl)ether, ethylene glycol bis(trifluoromethyl)ether, and diethylene glycol bis(trifluoroethyl)ether. Of those, dioxolane is preferred.

The saturated chain ester compound is preferably a monoester compound or a diester compound having 2 to 8 carbon atoms in total in a molecule thereof. Specific examples of the compound include methyl formate, ethyl formate, methyl acetate, ethyl acetate, propyl acetate, isobutyl acetate, butyl acetate, methyl propionate, ethyl propionate, methyl butyrate, methyl isobutyrate, methyl trimethylacetate, ethyl trimethylacetate, methyl malonate, ethyl malonate, methyl succinate, ethyl succinate, methyl 3-methoxypropionate, ethyl 3-methoxypropionate, ethylene glycol diacetyl, and propylene glycol diacetyl. Of those, methyl formate, ethyl formate, methyl acetate, ethyl acetate, propyl acetate, isobutyl acetate, butyl acetate, methyl propionate, and ethyl propionate are preferred.

Other than the foregoing, for example, acetonitrile, propionitrile, nitromethane, derivatives thereof, and various ionic liquids may each also be used as the organic solvent used for preparation of the non-aqueous electrolyte.

Examples of the polymer to be used in the gel polymer electrolyte include polyethylene oxide, polypropylene oxide, polyvinyl chloride, polyacrylonitrile, polymethyl methacrylate, polyethylene, polyvinylidene fluoride, and polyhexafluoropropylene. Examples of the polymer to be used in the pure polymer electrolyte include polyethylene oxide, polypropylene oxide, and polystyrenesulfonic acid. The blending ratio in the gel electrolyte and a compositing method are not particularly limited, and a known blending ratio and a known compositing method in the technical field may be adopted.

In order to prolong the lifetime of the battery and improve the safety thereof, the non-aqueous electrolyte may further comprise a known additive, such as an electrode film forming agent, an antioxidant, a flame retardant, or an overcharge inhibitor. When the additive is used, the amount of the additive is generally from 0.01 part by mass to 10 parts by mass, preferably from 0.1 part by mass to 5 parts by mass with respect to the entirety of the non-aqueous electrolyte.

The non-aqueous electrolyte secondary battery to which the present invention can be applied may comprise a separator between the positive electrode and the negative electrode. A microporous polymer film generally used for the non-aqueous electrolyte secondary battery may be used as the separator without no particular limitations. Examples of the film include films consisting of polymer compounds containing, as main components, for example, any of polyethylene, polypropylene, polyvinylidene fluoride, polyvinylidene chloride, polyacrylonitrile, polyacrylamide, polytetrafluoroethylene, polysulfone, polyethersulfone, polycarbonate, polyamide, polyimide, polyethers, such as polyethylene oxide and polypropylene oxide, various celluloses, such as carboxymethyl cellulose and hydroxypropyl cellulose, and poly(meth)acrylic acid and various esters thereof, derivatives thereof, copolymers thereof, and mixtures thereof. Those films may each be coated with a ceramic material, such as alumina or silica, magnesium oxide, an aramid resin, or polyvinylidene fluoride.

Those films may be used alone or as a multi-layer film in which those films are laminated on each other. Further, various additive may be used in each of those films, and the kind and content thereof are not particularly limited. Of those films, a film consisting of polyethylene, polypropylene, polyvinylidene fluoride, polysulfone, or a mixture thereof is preferably used in a method of manufacturing the secondary battery. When the non-aqueous solvent electrolyte is the pure polymer electrolyte or the inorganic solid electrolyte, the separator may not be incorporated.

A laminate film or a metal container may be used as an exterior member. The thickness of the exterior member is generally 0.5 mm or less, preferably 0.3 mm or less. Examples of the shape of the exterior member include a flat shape (thin shape), a rectangular shape, a cylindrical shape, a coin shape, and a button shape.

A multi-layer film comprising a metal layer between resin films may be used as the laminate film. The metal layer is preferably an aluminum foil or an aluminum alloy foil for weight saving. For example, a polymer material, such as polypropylene, polyethylene, nylon, or polyethylene terephthalate, may be used as the resin film. The laminate film may be sealed through thermal fusion and formed into the shape of the exterior member.

The metal container may be formed of, for example, stainless steel, aluminum, or an aluminum alloy. The aluminum alloy is preferably an alloy containing an element such as magnesium, zinc, or silicon. When the content of a transition metal, such as iron, copper, nickel, or chromium, in aluminum or the aluminum alloy is set to 1% or less, the long-term reliability and heat dissipation property of the battery under a high-temperature environment can be dramatically improved.

EXAMPLES

Now, the present invention is described in more detail way of the Examples and the Comparative Examples. However, the present invention is not limited to the Examples below. "Part(s)" and "%" in the Examples are by mass unless otherwise specified. In addition, in the measurement of an average particle diameter, the measurement was performed with a laser diffraction/scattering particle size distribution analyzer (manufactured by HORIBA, Ltd., model: LA-950V2) through use of water as a dispersing medium.

Raw material PAN mixture: 10 parts by mass of polyacrylonitrile powder (manufactured by Sigma-Aldrich, average particle diameter: 200 μm, weight average molecular weight: about 150,000) and 30 parts by mass of sulfur powder (manufactured by Sigma-Aldrich, average particle diameter: 200 μm) were mixed in a mortar, and the mixture was used as a raw material for sulfur-modified polyacrylonitrile in each of Production Examples 1 to 3.

Production Example 1

Sulfur-modified polyacrylonitrile was produced by a method in conformity with Production Examples of Japanese Patent Application Laid-open No. 2013-054957. Specifically, 20 g of the raw material PAN mixture was loaded in a bottomed cylindrical glass tube having an outer diameter of 45 mm and a length of 120 mm, and a silicone plug comprising a gas introduction tube and a gas discharge tube was then installed in an opening of the glass tube. After the air in the inside of the glass tube was replaced with nitrogen, a lower portion of the glass tube was placed in a crucible-type electric furnace, and heated at 400° C. for 1 hour while hydrogen sulfide to be generated was removed by introducing nitrogen from the gas introduction tube. A sulfur vapor is refluxed by being condensed at an upper portion or a lid portion of the glass tube. After cooling, a product was placed in a glass tube oven, and heated at 250° C. for 2 hours while being vacuum suctioned, to thereby remove elemental sulfur therefrom. The resultant sulfur-modified product was pulverized with a ball mill, and coarse particles were then removed therefrom with a sieve having an opening of 40 μm. Thus, sulfur-modified polyacrylonitrile SPAN 1 having an average particle diameter of 10 μm was obtained.

Production Example 2

Sulfur-modified polyacrylonitrile was produced by a method in conformity with Example of Japanese Patent Application Laid-open No. 2014-022123. Specifically, there was used a reactor in which a ribbon-type screw having a shaft diameter of 5 mm and a shaft length of 600 mm, and having a screw diameter of 42 mm, a screw length of 450 mm, and a screw pitch of 30 mm was placed in a glass tube made of heat-resistant glass having an outer diameter of 50 mm, an inner diameter of 45 mm, and a length of 500 mm, silicone rubber plugs each having a hole for a screw at a center portion thereof and having a hole for gas introduction or discharge at a position apart from the center portion were installed on both ends of the glass tube, and further, glass thin tubes each made of heat-resistant glass having an outer diameter of 7 mm, an inner diameter of 5 mm, and a length of 100 mm were installed in the holes for gas introduction and discharge of each of the silicone rubber plugs. The reactor was mounted to a tubular electric furnace comprising a portion to be heated of 300 mm, and the electric furnace was inclined so that the reactor had an inclination of 5°. 30 g of the raw material PAN mixture was loaded from an upper portion of the inclined reactor. After the inside of the reactor was replaced with a nitrogen gas, the temperature of the electric furnace was set to 420° C., and the raw material PAN mixture was heated while being rotated at 0.5 revolution per minute. During the heating, a nitrogen gas was fed at a flow rate of 100 ml/min from the glass thin tube at a lower end of the reactor, and a hydrogen sulfide gas to be generated was discharged from the glass thin tube at an upper end thereof. In addition, sulfur having sublimated and adhered to the glass thin tube at the upper end was refluxed by being appropriately heated to be melted.

A product having passed through the portion to be heated of the reactor was subjected to the same operations as in Production Example 1 after cooling. Thus, sulfur-modified polyacrylonitrile powder SPAN 2 having an average particle diameter of 10 μm was obtained.

Production Example 3

A center portion of a glass tube made of heat-resistant glass having an outer diameter of 10 mm and an inner diameter of 6 mm was heated to be expanded. Thus, a volumetric pipette-type core tube made of glass comprising an expanded portion having an outer diameter of 30 mm and a length of 50 mm in a center portion thereof and thin tubes each having an outer diameter of 10 mm and a length of 150 mm at both ends thereof was produced.

5 g of the raw material PAN mixture was loaded in the expanded portion of the core tube, and the core tube was arranged so as to have an inclination of 5°. After the inside of the core tube was replaced with a nitrogen gas, the raw material PAN mixture was heated at 400° C. for 1 hour while being rotated at 1 revolution per minute. During the heating, a nitrogen gas was fed at a flow rate of 100 ml/min from a lower end of the core tube so that a hydrogen sulfide gas to be generated was able to be discharged from an upper end of the core tube. In addition, while a portion to be heated of the core tube was set to the entirety of the expanded portion, sulfur having sublimated and adhered to a thin tube portion was refluxed to the expanded portion by being appropriately heated to be melted.

The product was subjected to the same operations as in Production Example 1 after cooling. Thus, sulfur-modified polyacrylonitrile powder SPAN 3 having an average particle diameter of 10 μm was obtained.

Production Example 4

The same operations as in Production Example 1 were performed except that a mixture obtained by mixing 10 parts by mass of polyethylene of from 27 μm to 32 μm (manufactured by Corefront) and 30 parts by mass of sulfur powder (manufactured by Sigma-Aldrich, average particle diameter: 200 μm) in a mortar was used instead of the raw material PAN mixture. Thus, polythienoacene compound powder SPE having an average particle diameter of 10 μm was obtained.

The content of sulfur and specific surface area of each of SPAN 1 to SPAN 3 and SPE are shown in Table 1. The content of sulfur was calculated from analysis results using a CHN analyzer (manufactured by Elementar Analysensysteme GmbH, model: varioMICROcube) capable of analyzing sulfur and oxygen. In addition, the specific surface area was measured in conformity with JIS Z8830 (Determination of the specific surface area of powders (solids) by gas adsorption-BET method).

TABLE 1

|  | Content of sulfur (mass %) | Specific surface area (m$^2$/g) |
| --- | --- | --- |
| SPAN 1 | 36.9 | 7.8 |
| SPAN 2 | 37.0 | 8.2 |
| SPAN 3 | 37.2 | 8.2 |
| SPE | 43.8 | 6.5 |

[Production of Negative Electrode 1]

A disc-shaped negative electrode 1 was produced by cutting metal lithium having a thickness of 500 μm into a predetermined size.

[Production of Positive Electrode]

A slurry obtained by mixing an electrode active material, a conductive assistant, a binder, and water serving as a solvent with a rotation/revolution mixer so as to give a composition shown in Table 2 was applied onto a current collector by a doctor blade method, and dried at 90° C. for 3 hours. After that, the resultant electrode was cut into a predetermined size, and dried in vacuum at 120° C. for 2 hours. Thus, a disc-shaped electrode was produced. A carbon-coated aluminum foil and an aluminum foil were used as the current collectors in the cases of the organosulfur electrode active materials and NCM, respectively.

Comparative Electrode Active Material

NOM: LiNi$_{1/3}$Co$_{1/3}$Mn$_{1/3}$O$_2$ (manufactured by Nihon Kagaku Sangyo Co., Ltd.)

Conductive Aid

AB: acetylene black (manufactured by Denka Company Limited, product name: Denka black Li-100)

Binder

ACB: polyacrylic acid (polycarboxylic acid-based binder)

[Preparation of Non-Aqueous Electrolyte]

A non-aqueous electrolyte was prepared by dissolving LiPF$_6$ at a concentration of 1.0 mol/L in a mixed solvent consisting of 50 vol % of ethylene carbonate and 50 vol % of diethyl carbonate.

[Assembly of Battery]

The positive electrode of each of Examples 1 to 9 and Comparative Examples 1 to 9 and the disc-shaped negative electrode obtained by cutting metal lithium having a thickness of 500 μm into a predetermined size were held in a case while a glass filter serving as a separator was sandwiched therebetween. After that, the non-aqueous electrolyte prepared in advance was injected into the case, and the case was hermetically sealed. Thus, a non-aqueous electrolyte secondary battery (a coin-shaped battery having a diameter of φ20 mm and a thickness of 3.2 mm) was produced. The positive electrode of each of Comparative Examples 8 and 9 had an insufficient binding property of its electrode active material mixture layer, and a battery could not be produced. As a result, a charge-discharge test was not performed.

[Charge-Discharge Test Method]

The non-aqueous electrolyte secondary battery was placed in a constant-temperature bath at 30° C., and subjected to 5 cycles of charging and discharging at a charge rate of 0.1 C and a discharge rate of 0.1 C in which a charge final voltage and a discharge final voltage were set to 3.0 V and 1.0 V, respectively, in each of Examples 1 to 9 and Comparative Examples 1 to 5, in which the organosulfur electrode active material was used as the electrode active material, and were set to 4.2 V and 3.0 V, respectively, in each of Comparative Examples 6 to 9, in which NCM was used as the electrode active material. A discharge capacity A, which is a discharge capacity per mass of the electrode active material, and a discharge capacity B, which is a discharge capacity per mass of the electrode active material mixture layer, at the fifth cycle are shown in Table 2.

The discharge capacity B, which is a discharge capacity per mass of the electrode active material mixture layer, of each of the batteries of Examples 1 to 9, in which the organosulfur electrode active material is used, is higher than that of each of the batteries of Comparative Examples 1 to 4. This indicates that, even when the amount of the binder is reduced, a satisfactory electrode active material mixture layer is formed, and a charge-discharge capacity per mass of the electrode can be increased. Among the organosulfur electrode active materials, the sulfur-modified polyacrylonitriles each provide a higher discharge capacity B than the polythienoacene compound. Among the sulfur-modified polyacrylonitriles, the sulfur-modified polyacrylonitrile (SPAN 3) produced by subjecting polyacrylonitrile and sulfur to heat treatment with a rotating-type heating container provides a higher discharge capacity B.

[Production of Battery]

The positive electrode of each of Example 10, Example 11, Comparative Example 10, and Comparative Example 11 and the disc-shaped negative electrode obtained by cutting metal lithium having a thickness of 500 μm into a predetermined size were held in a case while a glass filter serving as a separator was sandwiched therebetween. After that, the non-aqueous electrolyte prepared in advance was injected into the case, and the case was hermetically sealed. Thus, a non-aqueous electrolyte secondary battery (a coin-shaped battery having a diameter of φ20 mm and a thickness of 3.2 mm) was produced.

[Charge-Discharge Test Method]

The non-aqueous electrolyte secondary battery was placed in a constant-temperature bath at 0° C., and subjected to 3 cycles of charging and discharging at a charge rate of 0.1 C and a discharge rate of 0.1 C in which a charge final voltage and a discharge final voltage were set to 3.0 V and 1.0 V, respectively. A discharge capacity C, which is a discharge capacity per mass of the electrode active material, and a discharge capacity D, which is a discharge capacity per mass of the electrode active material mixture layer, at the third cycle are shown in Table 3.

TABLE 2

| | Electrode active material | Conductive assistant | Binder | Discharge capacity A (mAh/g) | Discharge capacity B (mAh/g) |
|---|---|---|---|---|---|
| Comparative Example 1 | SPAN 1 (94.0) | AB (3.0) | ACB (3.0) | 543 | 510 |
| Example 1 | SPAN 1 (96.6) | AB (3.0) | ACB (0.4) | 539 | 521 |
| Example 2 | SPAN 1 (96.9) | AB (3.0) | ACB (0.1) | 528 | 512 |
| Comparative Example 2 | SPAN 2 (94.0) | AB (3.0) | ACB (3.0) | 543 | 510 |
| Example 3 | SPAN 2 (96.6) | AB (3.0) | ACB (0.4) | 542 | 524 |
| Example 4 | SPAN 2 (96.9) | AB (3.0) | ACB (0.1) | 531 | 515 |
| Comparative Example 3 | SPAN 3 (94.0) | AB (3.0) | ACB (3.0) | 544 | 511 |
| Example 5 | SPAN 3 (96.6) | AB (3.0) | ACB (0.4) | 544 | 526 |
| Example 6 | SPAN 3 (96.9) | AB (3.0) | ACB (0.1) | 544 | 527 |
| Example 7 | SPAN 3 (96.99) | AB (3.0) | ACB (0.01) | 535 | 519 |
| Comparative Example 4 | SPAN 3 (97.0) | AB (3.0) | ACB (0.0) | 521 | 505 |
| Comparative Example 5 | SPE (94.0) | AB (3.0) | ACB (3.0) | 521 | 490 |
| Example 8 | SPE (96.6) | AB (3.0) | ACB (0.4) | 512 | 495 |
| Example 9 | SPE (96.9) | AB (3.0) | ACB (0.1) | 507 | 491 |
| Comparative Example 6 | NCM (94.0) | AB (3.0) | ACB (3.0) | 146 | 137 |
| Comparative Example 7 | NCM (96.1) | AB (3.0) | ACB (0.9) | 122 | 117 |
| Comparative Example 8 | NCM (96.4) | AB (3.0) | ACB (0.4) | — | |
| Comparative Example 9 | NCM (96.9) | AB (3.0) | ACB (0.1) | — | |

TABLE 3

| | Electrode active material | Conductive assistant | Binder | Discharge capacity C (mAh/g) | Discharge capacity D (mAh/g) |
|---|---|---|---|---|---|
| Comparative Example 10 | SPAN 1 (94.0) | AB (3.0) | ACB (3.0) | 480 | 451 |
| Comparative Example 11 | SPAN 1 (96.1) | AB (3.0) | ACB (0.9) | 475 | 456 |
| Example 10 | SPAN 1 (96.6) | AB (3.0) | ACB (0.4) | 477 | 461 |
| Example 11 | SPAN 2 (96.9) | AB (3.0) | ACB (0.1) | 475 | 460 |

The discharge capacity D, which is a discharge capacity per mass of the electrode active material mixture layer, of each of the batteries of Example 10 and Example 11 is higher than that of each of the batteries of Comparative Example 10 and Comparative Example 11. This indicates that, even when the amount of the binder is reduced, a satisfactory electrode active material mixture layer is formed, and a charge-discharge capacity per mass of the electrode can be increased.

The invention claimed is:

1. An electrode for a non-aqueous electrolyte secondary battery, comprising:
   a current collector; and
   an electrode active material mixture layer containing an organosulfur electrode active material, a conductive assistant, and a binder,
   wherein the electrode active material mixture layer contains 0.01 mass % to 0.4 mass % of the binder with respect to a total mass of the electrode active material mixture layer, and
   wherein the electrode active material mixture layer is formed on the current collector.

2. The electrode for a non-aqueous electrolyte secondary battery according to claim 1, wherein the organosulfur electrode active material has an average particle diameter of from 0.1 µm to 50 µm and a specific surface area of from 0.5 m²/g to 30 m²/g measured by a BET method.

3. The electrode for a non-aqueous electrolyte secondary battery according to claim 1, wherein the organosulfur electrode active material is sulfur-modified polyacrylonitrile.

4. The electrode for a non-aqueous electrolyte secondary battery according to claim 1, wherein the binder is at least one kind selected from the group consisting of: a polyolefin-based binder; a polydiene-based binder; a polycarboxylic acid-based binder; a polyether-based binder; a polyvinyl alcohol-based binder; a polyacrylonitrile-based binder; a cellulose-based binder; a polyester-based binder; and a polyurethane-based binder.

5. A non-aqueous electrolyte secondary battery, comprising the electrode for a non-aqueous electrolyte secondary battery of claim 1 as a positive electrode.

6. A non-aqueous electrolyte secondary battery, comprising the electrode for a non-aqueous electrolyte secondary battery of claim 1 as a negative electrode.

7. A method of manufacturing an electrode for a non-aqueous electrolyte secondary battery, comprising the steps of:
   adding an organosulfur electrode active material, a conductive assistant, and a binder to a solvent to prepare a slurry; and
   applying the slurry onto a current collector to form an electrode active material mixture layer,
   wherein the electrode active material mixture layer contains 0.01 mass % to 0.4 mass % of the binder with respect to a total mass of the electrode active material mixture layer.

8. The method of manufacturing an electrode for a non-aqueous electrolyte secondary battery according to claim 7, wherein the organosulfur electrode active material is sulfur-modified polyacrylonitrile.

9. The electrode for a non-aqueous electrolyte secondary battery according to claim 1, wherein the organosulfur electrode active material is selected from the group consisting of a sulfur-modified polyacrylonitrile, a sulfur-modified elastomer compound, a sulfur-modified polynuclear aromatic compound, a sulfur-modified pitch compound, a polythienoacene compound, a sulfur-modified polyether compound, a sulfur-modified polyamide compound, a sulfur-modified aliphatic hydrocarbon oxide, carbon polysulfide and combinations thereof.

* * * * *